United States Patent [19]
Morita

[11] Patent Number: 5,360,105
[45] Date of Patent: Nov. 1, 1994

[54] CONTAINER CASE FOR MAGNETIC TAPE CASSETTE

[75] Inventor: Kiyoo Morita, Kanagawa, Japan

[73] Assignee: Fuji Photo Film Co., Ltd., Kanagawa, Japan

[21] Appl. No.: 179,825

[22] Filed: Jan. 11, 1994

Related U.S. Application Data

[63] Continuation of Ser. No. 958,160, Oct. 9, 1992.

[30] Foreign Application Priority Data

Oct. 15, 1991 [JP] Japan .................. 3-091901

[51] Int. Cl.$^5$ .......................................... B65D 85/672
[52] U.S. Cl. .................................. 206/232; 206/387
[58] Field of Search ................ 206/232, 387, 493, 485

[56] References Cited

U.S. PATENT DOCUMENTS

| | | | |
|---|---|---|---|
| 3,763,994 | 10/1973 | Somers | 206/387 X |
| 3,909,088 | 9/1975 | Dennehey et al. | 206/387 X |
| 4,648,507 | 3/1987 | Komiyama et al. | |
| 4,651,876 | 3/1987 | Tanuma et al. | 206/387 |
| 5,158,176 | 10/1992 | Wolf | 206/387 X |
| 5,160,028 | 11/1992 | Morita | 206/387 |
| 5,186,325 | 2/1993 | Sato et al. | 206/387 X |
| 5,279,418 | 1/1994 | Wheatley | 206/587 |
| 5,282,536 | 2/1994 | Sato et al. | 206/387 |

FOREIGN PATENT DOCUMENTS

| | | |
|---|---|---|
| 2488029 | of 0000 | European Pat. Off. |
| 0440424 | 8/1991 | European Pat. Off. |
| 0494690 | 7/1992 | European Pat. Off. |
| 3927940 | of 0000 | Germany |

*Primary Examiner*—Jacob K. Ackun, Jr.
*Attorney, Agent, or Firm*—Sughrue, Mion, Zinn, Macpeak & Seas

[57] ABSTRACT

A magnetic tape cassette container case which is reduced in outer size, and which reduces the amount of rattling of a magnetic tape cassette contained therein. A pocket for receiving thick portions of the magnetic tape cassette is provided, and grooves for respectively receiving externally projecting guide portions formed respectively on the magnetic tape cassette are formed in inner surfaces of right and left side walls constituting the pocket.

5 Claims, 4 Drawing Sheets

CONTAINER CASE FOR MAGNETIC TAPE CASSETTE

This is a continuation of application Ser. No. 07/958,160 filed Oct. 9, 1992.

BACKGROUND OF THE INVENTION

The present invention relates to a container case for a magnetic tape cassette, and more particularly to an improved magnetic tape cassette container case used for storage of an audio magnetic tape cassette.

A magnetic tape cassette for audio recording and/or reproducing purposes or the like is usually placed in a magnetic tape cassette container case for storage when it is not in use.

Such magnetic tape cassettes have cassette front openings into which magnetic heads are inserted when the cassette is loaded into a recording/reproducing device, and a magnetic tape in the cassette is caused to run across these front openings. However, foreign matter such as dust or fine particles tend to intrude into the cassette through the front openings, and when such a dust deposits on the magnetic tape, signal drop-out can develop so that the high quality of recording and reproducing can no longer be achieved. Further, because the housing of the cassette is molded of a synthetic resin, the cassette is prone to breakage by an impact produced, for example, when the cassette is dropped.

In order to prevent dust from depositing on the magnetic tape and also to protect the whole of the cassette, the cassette is contained in the container case.

Referring to a basic construction of the container case, the container case includes a lid member having a pocket for receiving the thick portions of the cassette, and the lid member pivotally connected to a casing member so that it can be opened and closed like a door. Each of the lid member and the casing member is integrally molded of a synthetic resin.

When the cassette is to be stored in the container case, the thick portions, in which the front openings are formed, are inserted into the pocket, and then the lid member and the casing member are closed together. As a result, the whole of the cassette is contained in the container case, and thus can be stored a dust-preventing, impact-resistant manner.

The appearance or external shape of a cassette 11 of a type presently in extensive use will now be described with reference to FIG. 7. As shown therein, the cassette is flat as a whole, with thick portions 12 formed on opposite faces adjacent to the front openings of the cassette. Shaft insertion holes 13 through which pass respective shafts for driving the magnetic tape wound on hubs also are formed in the opposite faces of the cassette. External guide portions 14 in the form of an elongated projection are formed on each of right and left side walls of the cassette 11, these external guide portions 14 being used when loading the cassette 11 into a tape recorder or the like.

The thick portions 12 and the external guide portions 14 must be standardized for purposes of making the cassette interchangeable, and hence cannot be omitted. Therefore, the inner dimensions of the pocket of the container case must be determined so as to receive both the thick portions 12 and the external guide portions 14, and some gaps for insertion and withdrawal purposes are also required, Therefore, it is inevitable to make the outer dimensions of the container case longer than that of the outer dimensions of the cassette, adding at least the thickness of the walls of the container case per se, and the gaps.

On the other hand, the magnetic tape cassette is often used in an automobile, and is also taken out and used outdoors. In view of such use, if the container case is of a large size, a large amount of storage space is required in an automobile or the like, and a large size is also inconvenient from the viewpoint of portability. Therefore, it has been desired to provide a small-sized and thin cassette.

Further, although the container case of the above construction receives the thick portions in its pocket, it has no means for snugly fitting or retaining the cassette relative to the case, and therefore the cassette can rattle within the container case when carrying the container case.

SUMMARY OF THE INVENTION

With the foregoing in view, it is an object of this invention to provide a magnetic tape cassette container case which is smaller in outer size than a conventional case and in which rattling of a magnetic tape cassette contained in the case is eliminated.

The above object has been achieved by a magnetic tape cassette container case wherein a lid member, having a pocket for receiving the thick portions of a magnetic tape cassette, is pivotally connected to a casing member having rotation prevention projections, and grooves for receiving respective externally projecting guide portions formed on right and left side walls of the magnetic tape cassette are formed on inner surfaces of right and left side walls constituting the pocket.

Since the externally projecting guide portions of the cassette are received in the respective grooves, the externally projecting guide portions are, so to speak, buried respectively in the right and left side walls constituting the pocket, and therefore the outer size of the container case can be reduced at least by an amount corresponding to the sum of the heights of the externally projecting guide portions.

DESCRIPTION OF THE PREFERRED EMBODIMENTS

Figure 1:
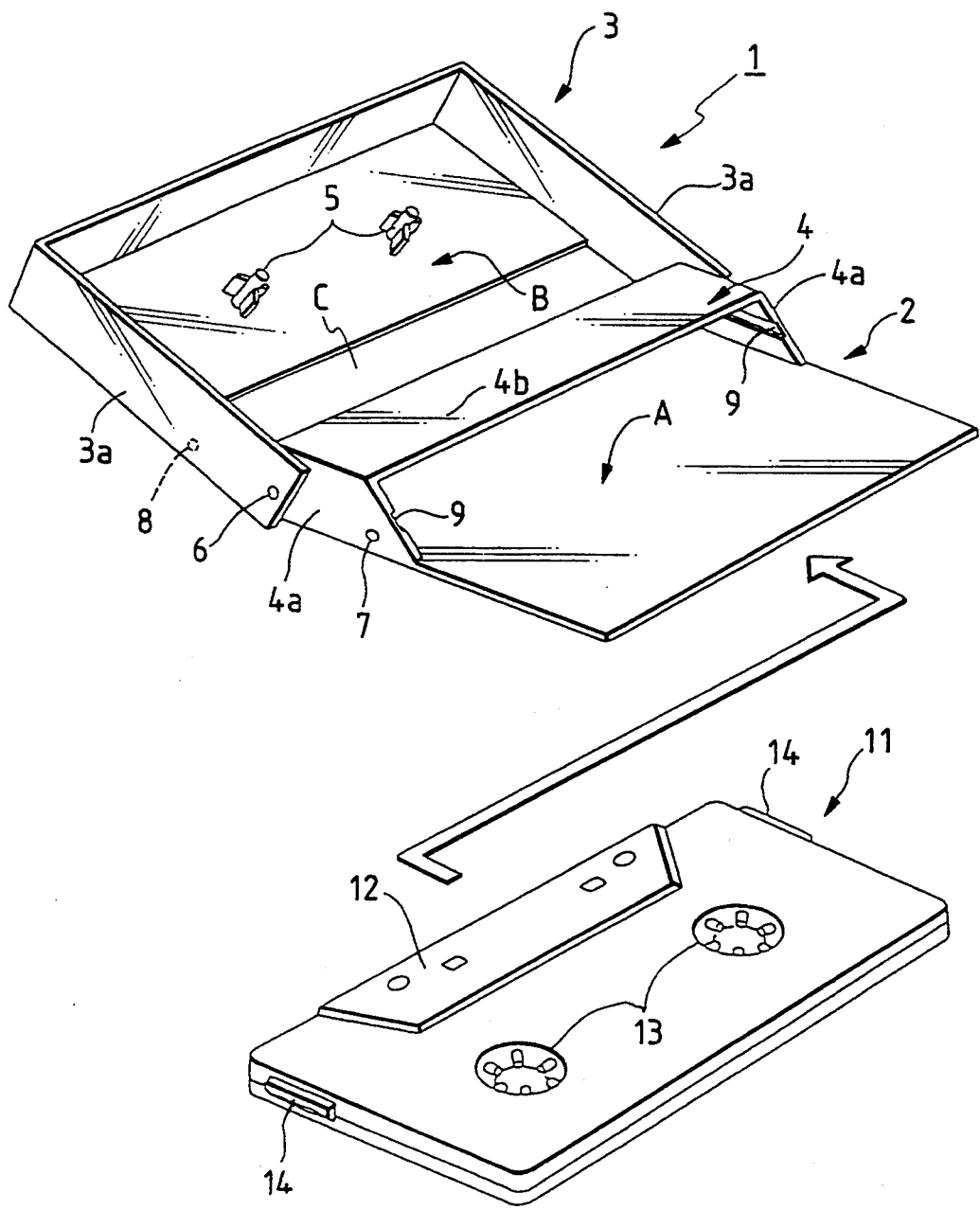
FIG. 1 is a perspective view explanatory of a first preferred embodiment of a magnetic tape cassette container case of the present invention.
Figure 2:
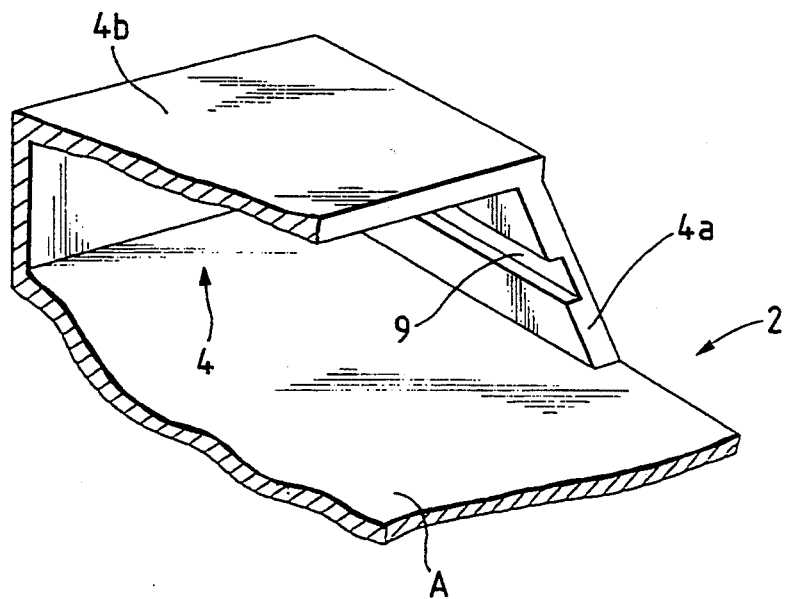
FIG. 2 is an enlarged perspective view of an important portion of the magnetic tape cassette container case of FIG. 1.
Figure 3:
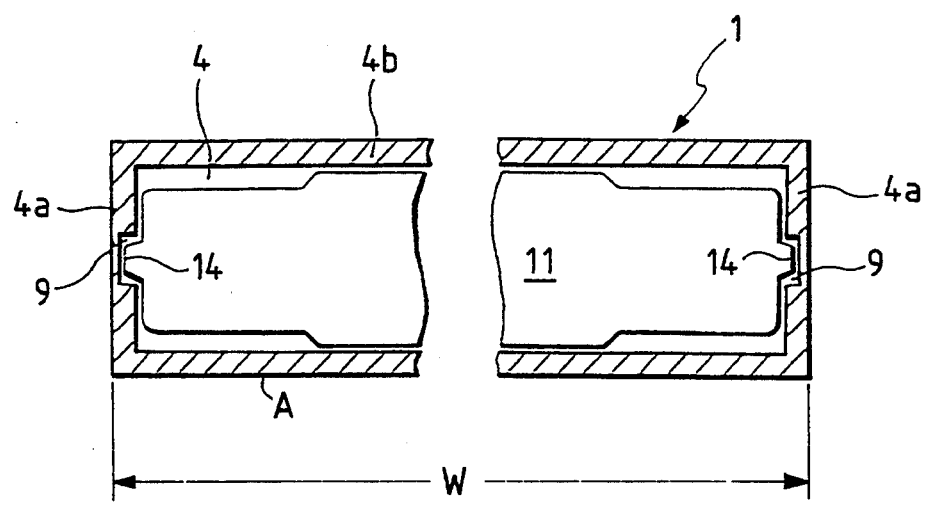
FIG. 3 is an enlarged cross-sectional view of an important portion of the magnetic tape cassette container case of FIG. 1.

A first preferred embodiment of the present invention will now be described in detail with reference to FIGS. 1 to 3. FIG. 1 is a perspective view showing a magnetic tape cassette container case of the invention and a magnetic tape cassette, FIG. 2 is an enlarged perspective view of an important portion of the cassette container case of FIG. 1, and FIG. 3 is an enlarged cross-sectional view of an important portion of the case of FIG. 1

The magnetic tape cassette container case 1 includes a lid member 2 having a pocket 4, and a casing member 3 having a pair of rotation prevention projections 5 for a pair of hubs (not shown). Pivots 6 are formed on an inner surface of each of right and left side walls 3a of the casing member 3. These pivots 6 are fitted respectively in through holes (not shown) formed respectively through right and left side walls 4a of the pocket 4, so that the lid member 2 can be rotated around the pivot so as to be opened and closed like a door.

The pocket 4, which receives the thick portions 12 of the magnetic tape cassette 11, has a box-like configuration which has one open end and is defined by a flat plate portion A of the lid member 2, the right and left side walls 4a, and a top plate portion 4b of the lid member 2. When the casing member 3 and the lid member 2 are closed together with the cassette received therein, the pair of rotation prevention projections 5, formed on a flat plate portion B of the casing member 3, are inserted into respective shaft insertion holes 13 to be engaged with respective hubs, thereby preventing a magnetic tape T wound on the hubs from slackening inside the cassette.

A pair of projections 7 are formed on each of the right and left side walls 4a constituting the pocket 4. Engagement recesses 8 are formed respectively in those portions of the right and left side walls 3a disposed in registry with the projections 7 when the lid member 2 and the casing member 3 are closed together. Therefore, when the lid member 2 and the casing member 3 are closed together, the projections 7 are engaged with the engagement recesses 8 to hold the lid member 2 and the casing member 3 in their closed condition.

In the cassette container case 1 of the above construction, it is important to note that grooves 9 are formed in the respective inner wall surfaces of the pocket 4, that is, in the inner surfaces of the right and left side walls 4a which are disposed in opposed relation to each other. The grooves 9 receive respective external guide portions 14 when the thick portions 12 which are formed in the form of an elongated projection on each of right and left side walls of the cassette 11 are inserted into the pocket 4.

By virtue of the provision of the grooves 9, when the cassette 11 is stored in the case, the heights of the external guide portions 14 are received in the thicknesses of the right and left side walls 4a, respectively, as shown on an enlarged scale in FIG. 3. Therefore, the width W of the cassette container case 1 is reduced by a dimension twice as high as that of the external guide portion 14, that is, a dimension corresponding to the sum of the heights of the pair of external guide portions 14.

While the external guide portions 14 (which cannot be omitted for reasons of standardization) remain intact, the width W can be reduced by an amount generally corresponding to the sum of the heights of the external guide portions 14, thereby achieving a small-size design of the container case 1. The reception of the externally projecting guide portions 14 in the respective grooves 9 also achieves the effect of reducing the amount of rattling of the cassette 11.

Figure 4:
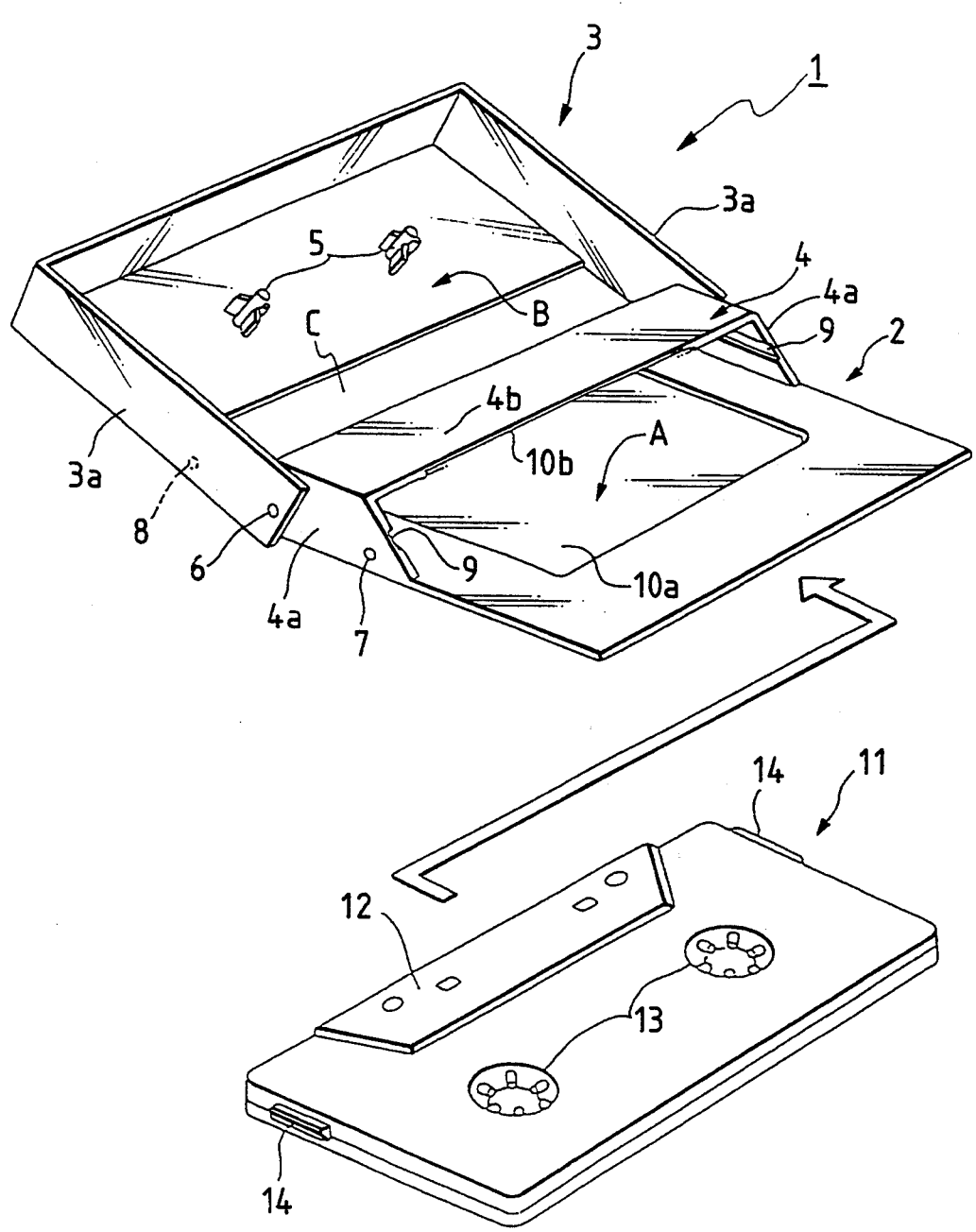
FIG. 4 is a perspective view of a second preferred embodiment of a container case of the present invention.

A second embodiment will now be described with reference to FIGS. 4 and 5. FIG. 4 is a perspective view showing the cassette container case 1 of the second embodiment and the cassette 11, and FIG. 5 is an enlarged cross-sectional view of an important portion thereof.

A feature of the second embodiment resides in the fact that recesses 10a and 10b for receiving the respective thick portions 12 are formed respectively in the flat plate portion A and the top plate portion 4b of the lid member 2. In these figures, those portions performing the same functions as those of the first embodiment are designated by identical reference numerals, and a further explanation thereof will be omitted.

The flat plate portion A of the lid member 2 has the recess 10a for receiving the thick portion 12 formed on the lower side of the cassette 11 in FIG. 4 (and hence cannot be seen in this drawing) when the cassette 11 is stored in the case, and the recess 10b for receiving the other thick portion 12 is formed in the inner surface of the top plate portion 4b constituting the pocket 4.

Figure 5:
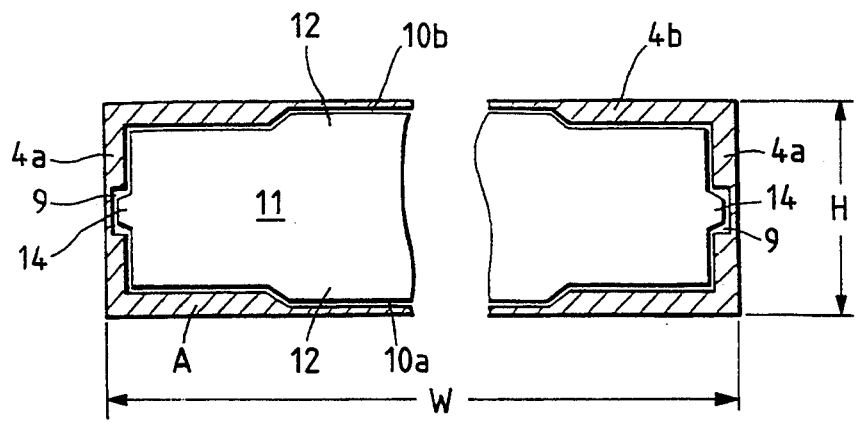
FIG. 5 is a enlarged cross-sectional view of an important portion of the container case of FIG. 4.

When the cassette 11 is stored in the cassette container case 1, the pair of upper and lower thick portions 12 are received in the recesses 10a and 10b, and the pair of right and left external guide portions 14 are received in the grooves 9, respectively, as shown in FIG. 5. Therefore, in the cassette container case 1 of this embodiment, not only is the width W reduced as described above, but also the height H of the cassette container case 1 can be reduced.

As shown in FIG. 4, the recess 10a is formed in the flat plate portion A with enough area to make the process of inserting the cassette 11 into the case 1 smooth. If the recess 10a is formed only beneath the top plate portion 4b, the upper thick portion 12 interferes with the edge of the top plate portion 4b before the lower thick portion 12 is received in the recess 10a when the cassette 11 is inserted into the case, which makes it difficult to insert the cassette into the pocket 4 in a smooth manner. However, with the recess 10a formed as shown in FIG. 4, the whole of the cassette 1 can descend before the upper thick portion 12 is brought into engagement with the edge, thereby ensuring a smooth containing operation.

Figure 6:
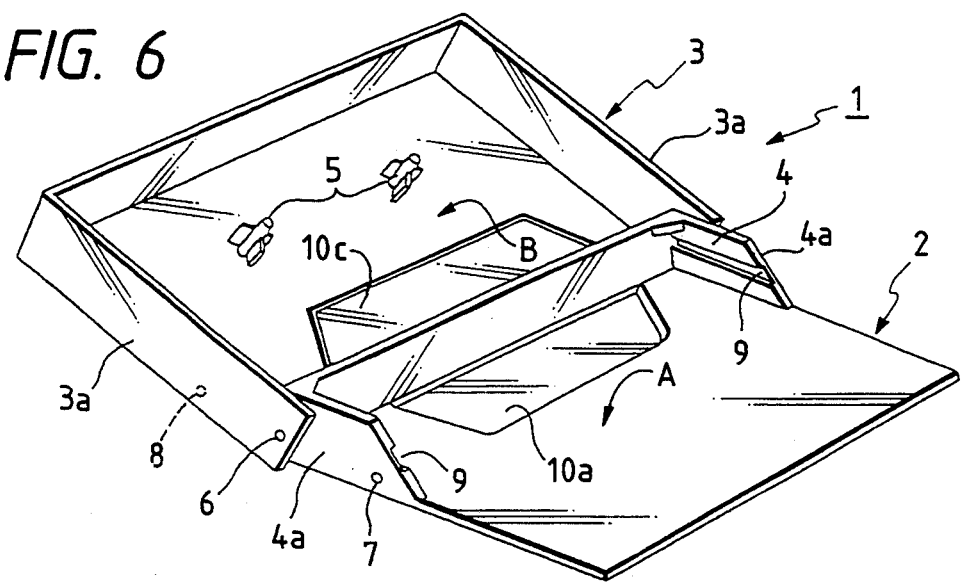
FIG. 6 is a perspective view of a third preferred embodiment of a container case of the present invention.
Figure 7:
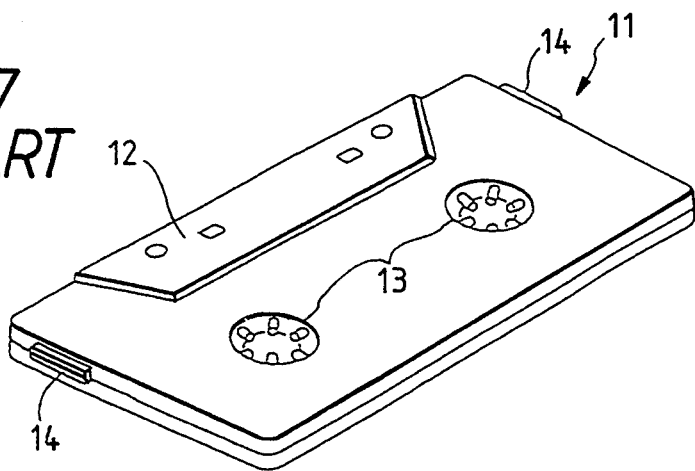
FIG. 7 is a perspective view of a conventional magnetic tape cassette.

A third embodiment will now be described with reference to FIG. 6. FIG. 6 is a perspective view of a cassette container case of the third embodiment. Features of this embodiment are that the top plate portion 4b as shown in FIG. 3 is omitted, while a recess 10c is formed in a flat plate portion B of a casing member 3 in place of the recess 10b. The position of the recess 10c is corresponding to that of the top plate portion 4b when the casing member and the lid member are closed together.

That portion where the recess 10c is formed was a cut-out portion c in the case where the top plate portion 4b was formed as shown in FIG. 4. In this embodiment, however, the flat plate portion B is extended to eliminate such a cutout portion c, and the recess 10c is formed therein.

In this embodiment, since the top plate portion 4b is not provided, the distance of movement of the cassette 11 along the flat plate portion A when inserting the cassette 11 into the case 1 can be decreased. Therefore, the recess 10a formed in the flat plate portion A may be generally similar in size and shape to the thick portion 12.

When the cassette 11 is to be inserted into the case, the lid member 2 is opened as shown in FIG. 6, and the lower thick portion 12 is inserted into the recess 10a simply by pushing the cassette 11 with the external guide portions 14 received in the respective grooves 9. Then, the lid member 2 is closed, so that the upper thick portion 12 is received in the recess 10c. Therefore, in the closed condition of the lid member 2 (that is, in the condition in which the cassette 11 is contained in the cassette container case 1), the thick portions 12 are received respectively in the recesses 10a and 10c, and the external guide portions 14 are received in respective ones of the grooves 9, as described above in regard to the second embodiment.

Thus, also in this embodiment, the heights of the thick portions 12 and the external guide portions 14 can be accommodated within the case 1, so that the whole size of the case can be reduced.

The present invention is not limited to the configurations of the above embodiments, and can be applied to a container case for storing a plurality of magnetic tape cassettes, and also to other container cases.

As described above, in the magnetic tape cassette container case according to the present invention, there is provided a pocket for receiving the thick portions of the magnetic tape cassette, and grooves for receiving respective externally projecting guide portions of the magnetic tape cassette are formed respectively in the inner surfaces of the right and left side walls constituting the pocket.

With this construction, the width of the container case can be reduced at least by an amount corresponding to the sum of the heights of the externally projecting guide portions, and therefore not only can a compact design of the container case be achieved, but also rattling of the cassette contained in the container case can be reduced.

What is claimed is:

1. In a magnetic tape cassette container case accommodating a magnetic tape cassette having first and second surfaces each having respective first and second portions and an opening, said first portions being formed opposite one another adjacent said opening and having a thickness greater than that of said second portions, wherein a lid member, having a pocket receiving said first portions of said magnetic tape cassette, is pivotally connected to a casing member having rotation prevention projections, the improvement wherein grooves receiving externally projecting guide portions on each of right and left side walls of the cassette are formed respectively in inner surfaces on right and left side walls of said lid member constituting said pocket extending only partially through said side walls such that said guide portions of said tape cassette are not exposed outside of said pocket.

2. The magnetic tape cassette container case of claim 1, wherein said lid member comprises a flat plate portion, a top plate portion, and right and left side walls, defining said pocket therebetween.

3. The magnetic tape cassette container case of claim 2, wherein recesses for receiving first portions of said cassette are formed respectively in said flat plate portion and said top plate portion.

4. The magnetic tape cassette container case of claim 3, wherein said recess formed in said flat plate portion has a wider area than that of said first portions of said cassette.

5. The magnetic tape cassette container case of claim 1, wherein said lid member and said casing member each include a flat plate portion, and wherein recesses for receiving said first portions of said cassette are formed in each of said flat plate portions of said lid member and said casing member.

* * * * *